Figure 1:
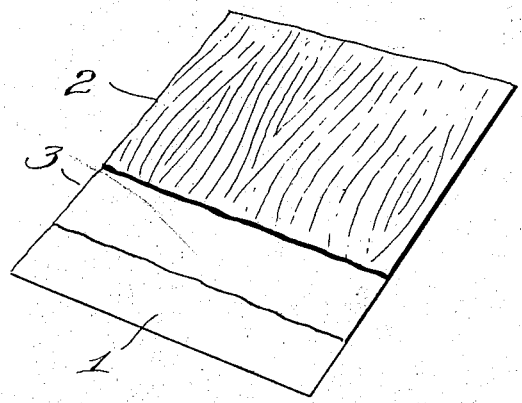

Feb. 9, 1937. A. ELMENDORF 2,070,527
FLEXIBLE WOOD FACED MATERIAL
Filed Jan. 9, 1933

Inventor:
Armin Elmendorf,
by Wm. F. Freudenreich,
Atty

Patented Feb. 9, 1937

2,070,527

UNITED STATES PATENT OFFICE 2,070,527

FLEXIBLE WOOD-FACED MATERIAL

Armin Elmendorf, Chicago, Ill., assignor to The Flexwood Company, a corporation of Delaware Application January 9, 1933, Serial No. 650,789

3 Claims. (Cl. 20—91)

In Patent No. 1,819,775 I have disclosed a new form of material consisting of a strong flexible sheet composed of wood veneer and a backing; and, viewed in one of its aspects, the present invention may be said to have for its object to improve that material.

The material forming the subject of the aforesaid patent is a sheet composed of a flexible backing to which is glued veneer which has been treated to render it limp; the sheet being applied in its position of final use by gluing, pasting or cementing it to the surface which it is to cover and conceal. Viewed in one of its aspects, the present invention may be said to have for its object to make it possible effectively to secure a sheet of this general type to a wall or other object or thing without the use of any glue, paste or cement or any other adhesive substance except that which is present in the backing layer of the sheet itself.

There are elastic, thermoplastic materials obtainable or which can easily be produced in the form of tissue or thin sheets that adhere tenaciously to a surface, but without losing their elasticity, when held against the same under heat and pressure. In accordance with my invention, I employ an elastic, thermoplastic material of this kind as the backing layer for the veneer which is made flexible in the manner described in the aforesaid patent or is softened in any other way. To secure a sheet of my improved material to a surface to be covered, it is simply laid against said surface, backing side down, and a hot iron is run over it. The veneer should be very thin, say not more than one-sixtieth of an inch thick, to prevent it from pulling away from the surface to which it is attached while the backing material is still soft or plastic.

Not only need there be no application of any adhesive in attaching one of my improved sheets, but the joint that is produced between the sheet and the supporting surface possesses distinct advantages over glue or paste joints. Starch paste, for example, that is commonly used in attaching sheet wall coverings to walls, shrinks in drying and exerts a strong pull on the marginal portions of each sheet, tending to curl them up; the result being that there is a tendency of meeting edges of adjacent sheets to draw away from each other and open gaps and, if the plaster is weak, the outer stratum of plaster tears away from the main body thereof along the edges of the sheets. On the other hand, since the means for adhering my sheets to a wall is the material of the flexible, elastic backing itself, the stresses just referred to and the objectionable consequences thereof are entirely avoided.

Therefore, viewed in another of its aspects, my invention may be said to have for its object to produce a simple and novel flexible wood-faced material having inherent therein means effectively to attach it to a support without creating any objectionable stresses in the joint between the material and the support.

Figure 2:
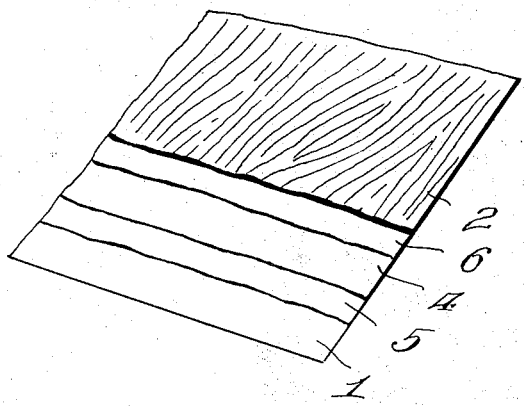
Figure 3:
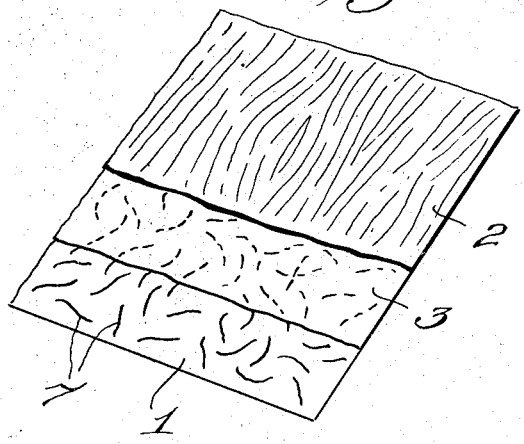
Figure 4:
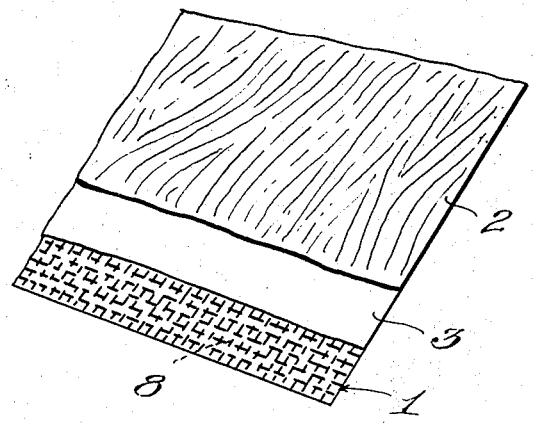
Figure 5:
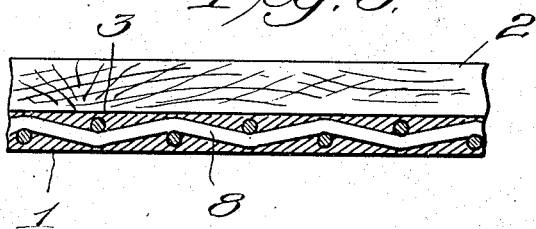

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figures 1, 2, 3 and 4 are perspective views of fragments of sheets embodying my invention in four different forms, the upper layer or strata being broken away to disclose the order of succession of such layers or strata; and Fig. 5 is a section, on a greatly magnified scale, through the material shown in Fig. 4.

Referring to Fig. 1 of the drawing, 1 represents a thin sheet of flexible, elastic, thermoplastic tissue which may conveniently be the tissue of commerce comprising gutta percha and balata. Overlying and glued to this sheet, which constitutes the flexible backing sheet or layer, is a sheet 2 of very thin wood veneer, preferably not over one-sixtieth of an inch in thickness and usually even thinner. The veneer and the backing are united by an interposed extremely thin layer 3 of glue.

When a sheet of my improved material is to be applied to a supporting surface, it need only be placed against the latter, with the thermoplastic backing in contact therewith; a hot iron or the like being then run over the same. The pressure of the iron on the flexible sheet flattens it into engagement with the surface to which it is to be secured, and the heat of the iron softens the thermoplastic backing sufficiently to make it adhere to said surface. Since the veneer is very thin it cannot exert a sufficient force to pull the backing away from the wall or other supporting surface while the backing is still hot or warm, even though the veneer be of such a character that it did not initially lie flat. Consequently, the work of securing the composite sheet to the supporting surfaces therefor is completed by the simple act of pressing the sheet flat and supplying to it sufficient heat properly to soften the backing. Thereafter the backing remains flexible and elastic, the usefulness of which characteristic has heretofore been explained.

If desired, there may be interposed between the flexible backing and the veneer any suitable reinforcing means. In Fig. 2 the reinforcing means is a sheet 4 of paper united to the backing 1 by a layer 5 of glue and to the veneer by a glue layer 6. In Fig. 3 the reinforcing is in the form of fibers 7, preferably fine silk threads scattered through or over the backing layer or through the glue. In any event the reinforcing fibers are embedded in the glue layer or in the backing and, being very fine, do not produce any surface irregularity in the veneer.

In Figs. 4 and 5 I have shown a reinforcing element in the form of an open mesh cloth 8. This cloth is embedded in the backing sheet or layer during the process of manufacturing the latter.

In manufacturing my compound material, the wood veneer and the flexible backing may first be united and the composite sheet be then treated to make the veneer flexible. When the flexibility or limpness of the wood veneer is caused by the rupturing thereof to divide it into small connected strands or filaments, this must be done after the backing is applied. My prior Patents, Nos. 1,778,250, 1,778,251 and 1,809,681, disclose methods and means for accomplishing this. In the case of material containing no reinforcing elements, it must be protected by a belt or belts, as in some such manner as is disclosed in Patent No. 1,778,250 while undergoing the rupturing treatment.

When the wood veneer is made flexible by the application of a softening agent, this may be done either before or after the veneer is united with the backing. There are many ways in which this kind of softening may be effected. Although the step or process of softening the wood forms no part of the present invention, it may be noted that thin veneer thoroughly soaked in a bath of glycerine and water and then dried will ordinarily be sufficiently soft and flexible for my purpose.

While I have illustrated and described with particularity only a single preferred form of my invention, with a few modifications, I do not desire to be limited to the exact structural details thus illustrated and described; but intend to cover all forms and arrangements which come within the definitions of my invention constituting the appended claims.

I claim:

1. A material comprising a single thickness of thin flexible wood veneer, a backing layer of flexible thermoplastic tissue, interposed flexible reinforcing means, and adhesive securing the veneer, the reinforcing means and the backing together.

2. A material comprising a single thickness of thin flexible wood veneer, a backing layer of flexible thermoplastic tissue, fine thread-like elements interposed between and disposed over the areas of the veneer and the backing layer, and adhesive joining the whole together.

3. A material comprising a layer in the form of a single thickness of thin flexible wood veneer, a backing layer of flexible thermoplastic tissue having embedded therein a sheet of openwork fabric, and adhesive uniting the aforesaid layers together.

ARMIN ELMENDORF.